United States Patent [19]

Schaedler

[11] 3,929,237
[45] Dec. 30, 1975

[54] SELF-STORING DOLLY

[76] Inventor: Alvin C. Schaedler, 1005 N. 17th St., Belleville, Ill. 62223

[22] Filed: Feb. 13, 1974

[21] Appl. No.: 442,070

[52] U.S. Cl......... 214/86 A; 280/478 A; 280/479 R; 280/482
[51] Int. Cl.² ............................................. B60P 3/12
[58] Field of Search... 214/86 A; 280/478 R, 479 R, 280/478 A, 478 B, 482, 402, 415 R, 415 A, 491 A, 491 R, 404

[56] References Cited
UNITED STATES PATENTS

| | | | |
|---|---|---|---|
| 1,851,349 | 3/1932 | Cowles | 280/478 R |
| 2,706,055 | 4/1955 | Nichols | 214/86 A |
| 3,547,290 | 12/1970 | Fratzke | 280/478 R X |
| 3,570,690 | 3/1971 | Wegener et al | 214/86 A |
| 3,649,048 | 3/1972 | Garnett | 280/479 R X |
| 3,690,482 | 9/1972 | Gaumont | 280/402 X |

Primary Examiner—Albert J. Makay
Attorney, Agent, or Firm—F. Travers Burgess

[57] ABSTRACT

A dolly for supporting one end of wrecked automobiles during towing is arranged to be stored beneath the towing vehicle when not in use and is constructed for easy projection and retraction from and to its stored position.

5 Claims, 3 Drawing Figures

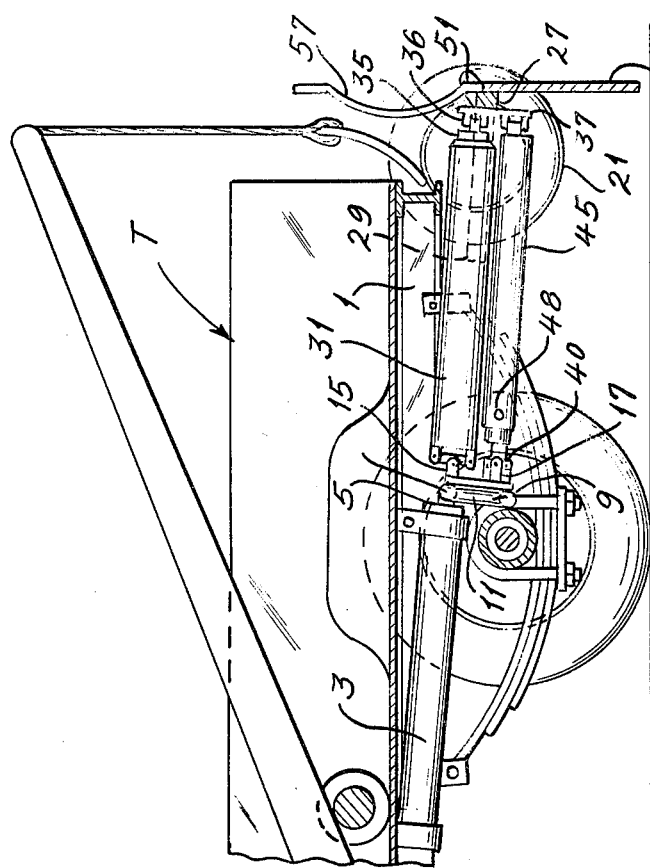
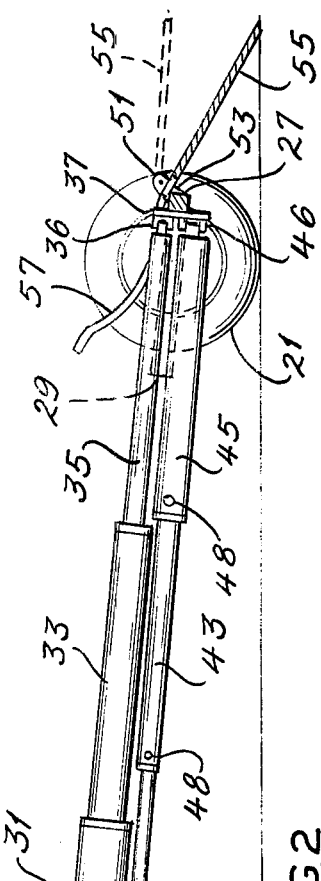
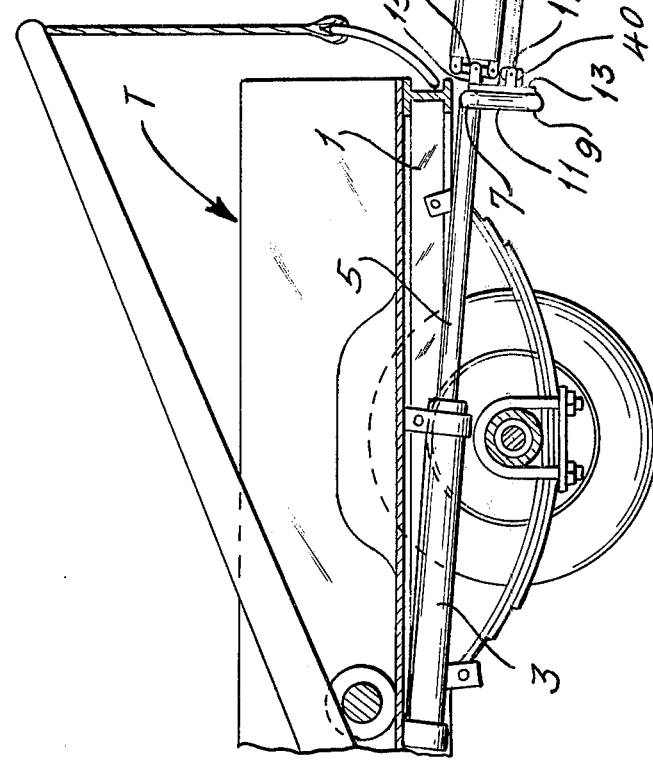

SELF-STORING DOLLY

BACKGROUND OF THE INVENTION

1. Field of the Invention

The invention relates to a trailer dolly and consists particularly in a trailer dolly especially suitable for towing wrecked automobiles.

2. The Prior Art

Dollies for supporting wrecked automobiles during towing have comprised a pair of wheels on a single axle, a rigid tongue for connecting the axle to a hitch or coupling on the rear end of a tow truck. Such dollies are disadvantageous in that during movement to the site of the wrecked car they extend a substantial distance to the rear of the tow truck and because of their light construction and extended configuration may be unstable when unloaded. If such dollies are carried in the bed of the tow truck to the site of the wrecked car, they require a large amount of space and present difficulties in lowering them into their operative position on the roadway behind the tow truck.

SUMMARY OF THE INVENTION

The invention provides a trailer-dolly for supporting a wrecked or disabled automobile or the like during towing. The dolly so provided is constructed and arranged to be stored and transported beneath the towing vehicle and is readily extensible rearwardly therefrom to provide an underlying wheeled support for the wrecked or disabled vehicle. It includes an apron pivotally mounted on the dolly to form a ramp for loading the vehicle on the dolly and a recess for supporting the vehicle on the dolly after it has been loaded.

BRIEF DESCRIPTION OF THE DRAWINGS

FIG. 2 is a longitudinal vertical sectional view along line 2—2 of FIG. 1.

FIG. 3 is a longitudinal vertical sectional view corresponding to FIG. 2, but showing the dolly in retracted inoperative position.

Figure 1:
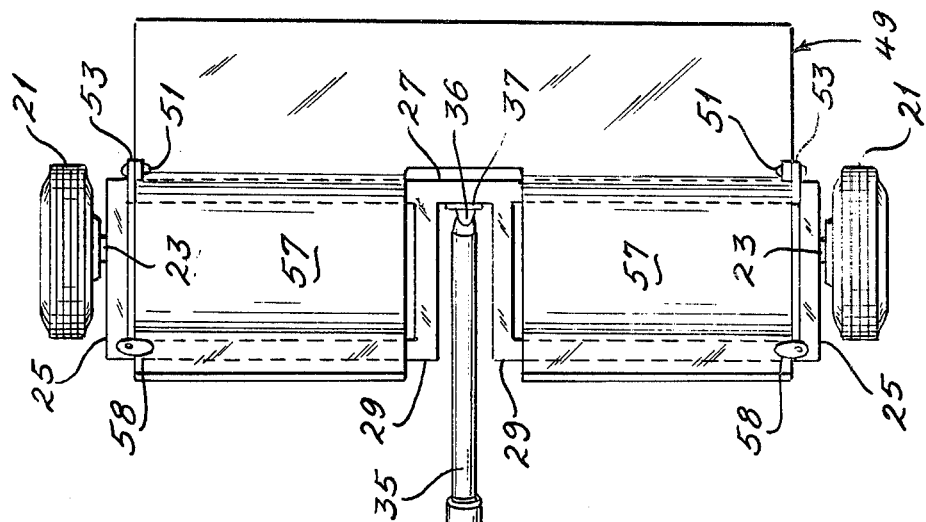
FIG. 1 is a plan view of a dolly constructed according to the invention, in its extended operating position, showing the rear portion of a truck on which it is mounted.
Figure 1:
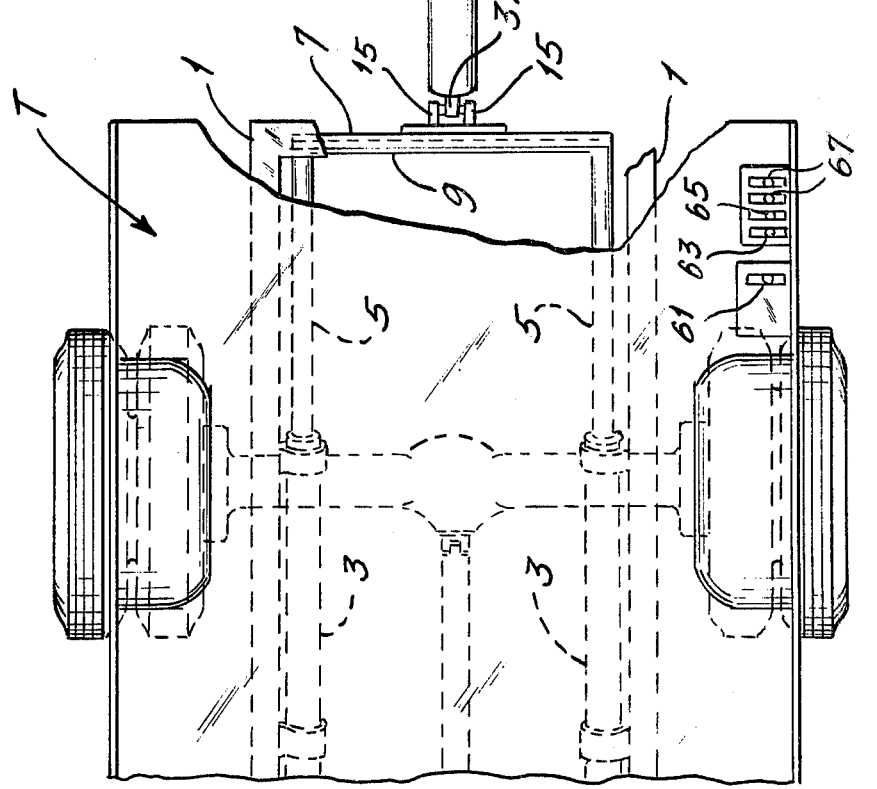

DETAILED DESCRIPTION OF THE INVENTION:

The numeral 1 denotes the chassis side rails of a motor vehicle comprising an automobile tow truck T.

A substantial distance inwardly from the rear end of truck T, each side rail 1 rigidly mounts a longitudinally extending hydraulic cylinder 3 slightly inclined downwardly from front to rear.

Pistons 5, slidably mounted in cylinder 3, are connected at their rear ends by structure comprising a transverse rectangular framework, the general plane of which is slightly inclined from the vertical, consisting of spaced transverse top and bottom members 7 and 9 and upright end members 11.

A plate 13 mounted on members 7 and 9 at the center of framework 7, 9, 11 mounts a pair of vertically spaced clevises 15 and 17 at its center for pivotal attachment of the dolly tongue to framework 7, 9, 11.

The dolly itself comprises a pair of small pneumatic-tired wheels 21, the spindles 23 of which are secured to short, longitudinally extending side members 25 of the dolly frame, which also includes a transverse rear member 27 and L-shaped front members 29 each connected at its one end to a side member 25 and at its other end to rear member 27, to form a frame having two rectangular side portions defined each by a side member 25, a rear member 27 and one of the L-shaped members 29, leaving a forwardly facing indentation at the center defined by the L-shaped members 29 and rear member 27.

Dolly frame 25, 27, 29 is connected to truck-mounted frame 7, 9, 11 by a draft tongue comprising three telescoping hydraulic cylinders 31, 33 and 35. The largest cylinder 31 is connected directly by a universal joint 32 to clevis 15 on truck-mounted frame 7, 9, 11 and the rear, smallest cylinder is connected directly to an upright plate 37 by a simple vertical axis clevis 36.

In order to stabilize dolly frame 25, 27, 29 against tipping about its support on wheel spindles 23, a telescopic stiff arm, comprising telescoping member 39, 41, 43 and 45 is positioned parallel to and in vertically spaced relation with tongue 31, 33, 35, forward member 39 being connected by a universal joint 40 to bottom clevis 17 and rear member 45 being connected by a single vertical axis clevis 46 to plate 37. Stiff arm 41, 43, 45 is provided with solenoid operated latches 48 for maintaining it in the extended or retracted position.

For loading disabled automobiles on the dolly and supporting the automobile wheels thereon after it is loaded, a combined apron and recess element, generally indicated at 49, is pivotally mounted by transverse axis pivot elements 51 to brackets 53 adjacent the ends of rear dolly frame member 27.

The rear portions of apron and wheel recess element 49 is a flat rectangular apron 55 and the forward portions are separate curved wheel recess elements 57. Apron 55 is of sufficient length, fore and aft, that when the dolly wheels 21 are on the ground, apron 55 can function as a ramp, as best seen in FIG. 2, for loading the automobile onto the dolly. When the automobile wheels become seated in recess elements 57, the weight of the automobile tips element 49 about pivots 51 to seat recess elements 57 in the openings in the dolly frame defined by L-shaped members 29 and rear member 27. Recess elements 57 are formed with flat lips, generally coplanar with apron 55 along their forward margins, to rest on elements 29 and thereby support the forward ends of the recess elements 57, as shown in broken lines in FIG. 2.

For projecting and retracting the dolly, conventional manually controlled hydraulic circuits (not shown) controlled by control lever knobs 61 and 63 mounted on the back of the truck, are connected to truck-mounted cylinders 3 and dolly tongue cylinder 31 and 33. Conventional electrical circuitry (not shown) is provided to actuate and release latches 48 on stiff arm 39, 41, 43, 45 and is controlled by knob 65.

Additional knobs 67 are provided to control individual wheel brakes on the dolly, and thereby facilitate maneuvering it for loading.

In FIG. 3 the dolly is shown in its fully-retracted position, with piston 5 retracted into cylinder 3, telescoping cylinders 33 and 35 retracted into cylinder 31, and stiff arm 39, 41, 43, 45 fully telescoped and locked in telescoping condition.

Operation of the dolly is as follows: With the parts positioned as in FIG. 3, truck T is backed generally toward the incapacitated automobile and stopped. Knob 61 is actuated to energize hydraulic cylinder 3 and project pistons 5 and frame 7, 9, 11 to the position shown in FIGS. 1 and 2. Knob 63 is actuated to energize cylinders 31 and 33 and thereby project the dolly to its fully-extended condition. The telescopic stiff arm is similarly extended and latches 48 are actuated to lock it in its extended position. The truck can then be restarted, and the dolly maneuvered by alternate braking of wheels 21 individually to push apron 55 under an end of the automobile and cause the latter to slide up apron 55 until it is supported in recesses 57, whereupon it causes apron element 49 to tip to the horizontal position, wherein it may be secured by clips 58 and towed away.

At its destination, the towed automobile can be removed from the dolly apron element can be released and swung to the vertical inoperative position, and the dolly retracted, by releasing latches 48 and energizing draft tongue cylinders 31 and 33 and truck-mounted cylinders 3, into the position shown in FIG. 3 in which the entire dolly is stowed beneath the truck body.

It will be understood that details of the disclosed construction may be varied as will occur to those skilled in the art without departing from the spirit of the invention and the exclusive use of all modifications as come within the scope of the appended claims is contemplated.

I claim:

1. In combination with a vehicle having a chassis, a two-wheel dolly, structure for coupling said dolly to said chassis, means extensibly and retractably mounting said structure on said chassis for movement between a stored ground elevated inoperative position substantially forward of the rear end of said chassis and an operative position near the rear end of said chassis, a telescoping draft tongue pivotally connected at its forward end to said coupling structure and at its rear end to said dolly and being extensible from its stored fully-telescoped condition wherein its rear end and said dolly are near the rear of said chassis when said coupling structure is in its stored position and its fully extended condition wherein said dolly is spaced a substantial distance rearwardly from said chassis.

2. The combination according to claim 1 wherein said telescoping tongue is hydraulically operated including a telescoping stiff arm device extending parallel to said tongue and being connected to said coupling structure and to said dolly at points vertically spaced from the corresponding connections of said tongue, said telescoping stiff arm being lockable in its extended position to stabilize said dolly against tilting about its wheel axes.

3. The combination according to claim 2 wherein said mounting means includes a pair of transversely spaced longitudinally extending hydraulic cylinders mounted on said chassis with their rear ends a substantial distance forward of the rear end of the vehicle and having their pistons rigidly connected at their rear ends to said structure.

4. The combination according to claim 1 wherein an apron element is pivotally mounted, on a transverse axis, on the rear of said dolly for pivotal movement, when said dolly is in operative position, between a vertical inoperative position, an inclined ramp-forming loading position, and a horizontal loaded position.

5. The combination according to claim 4 wherein said dolly has a generally horizontal frame comprising spaced front and rear transverse members, said apron element being pivotally mounted on said rear transverse member and being adapted to rest on and be supported by said front transverse member when in horizontal loaded position.

\* \* \* \* \*